(12) United States Patent
Marshall, Jr. et al.

(10) Patent No.: US 6,668,300 B1
(45) Date of Patent: Dec. 23, 2003

(54) COMPUTER DEVICE HAVING MULTIPLE LINKED PARALLEL BUSSES AND ASSOCIATED METHOD

(75) Inventors: Joseph R. Marshall, Jr., Manasses, VA (US); Daniel L. Stanley, Warrenton, VA (US)

(73) Assignee: Bae Systems Information and Electronic Systems Integration Inc., Manassas, VA (US)

( * ) Notice: Subject to any disclaimer, the term of this patent is extended or adjusted under 35 U.S.C. 154(b) by 452 days.

(21) Appl. No.: 09/662,506

(22) Filed: Sep. 14, 2000

(51) Int. Cl.[7] .............................................. G06F 13/14
(52) U.S. Cl. ......................................... 710/305; 439/55
(58) Field of Search ............................... 710/306, 310, 710/305, 22, 301–304, 36

(56) References Cited

U.S. PATENT DOCUMENTS

| | | | | |
|---|---|---|---|---|
| 4,293,908 A | * | 10/1981 | Bradley et al. ................ 710/22 |
| 5,191,657 A | * | 3/1993 | Ludwig et al. .............. 710/105 |
| 5,276,814 A | * | 1/1994 | Bourke et al. .............. 710/105 |
| 5,315,488 A | * | 5/1994 | Le Gallo et al. ............ 361/796 |
| 5,386,535 A | * | 1/1995 | Carteau ....................... 711/161 |
| 5,499,344 A | * | 3/1996 | Elnashar et al. ............ 710/310 |
| 5,592,685 A | | 1/1997 | Pawlowski ................... 395/882 |
| 5,625,780 A | | 4/1997 | Hsieh et al. ................. 395/311 |
| 5,696,949 A | | 12/1997 | Young ........................... 395/551 |
| 5,764,924 A | * | 6/1998 | Hong ........................... 710/300 |
| 5,812,798 A | | 9/1998 | Moyer et al. ................ 395/307 |
| 5,822,551 A | | 10/1998 | Crane, Jr. et al. ............ 395/307 |
| 5,887,144 A | | 3/1999 | Guthrie et al. .............. 395/281 |
| 6,202,109 B1 | * | 3/2001 | Salo et al. ................... 710/301 |
| 6,209,050 B1 | * | 3/2001 | Iho et al. ..................... 710/301 |
| 6,275,549 B1 | * | 8/2001 | Greatwood et al. ......... 375/356 |
| 6,282,144 B1 | * | 8/2001 | Batson et al. ........... 365/230.05 |
| 6,333,750 B1 | * | 12/2001 | Odryna et al. .............. 345/629 |
| 6,463,493 B1 | * | 10/2002 | Hayes et al. ................. 710/301 |
| 6,510,484 B1 | * | 1/2003 | Kim et al. ................... 710/314 |
| 2002/0001991 A1 | * | 1/2002 | Schmitt et al. ............... 439/376 |
| 2003/0009613 A1 | * | 1/2003 | Papa et al. ................... 710/305 |

* cited by examiner

*Primary Examiner*—Xuan M. Thai
*Assistant Examiner*—Kim T. Huynh
(74) *Attorney, Agent, or Firm*—Allen, Dyer, Doppelt, Milbrath & Gilchrist, P.A.

(57) ABSTRACT

A computer device includes an interface board, a plurality of peripheral component interface (PCI) busses on the interface board, and a plurality of device card connectors carried by the interface board. The plurality of device card connectors include at least one first device card connector coupled to first and second PCI busses synchronous with one another, and at least one second device card connector coupled to the second PCI bus and to a third PCI bus asynchronous with the second PCI bus. The PCI busses are thus connected so that the PCI busses may be added in groups according to the number of device card connectors supported by the interface board, and not by the loading constraints of the PCI busses themselves. By defining both synchronous and asynchronous device card connectors, device cards requiring either synchronous or asynchronous communications may be utilized by the computer device. Each device card includes an interface bridge for connecting to a respective asynchronous or synchronous device card connector.

53 Claims, 5 Drawing Sheets

COMPUTER DEVICE HAVING MULTIPLE LINKED PARALLEL BUSSES AND ASSOCIATED METHOD

FIELD OF THE INVENTION

The present invention relates to the field of computer systems, and, more particularly, to a computer device including parallel busses.

BACKGROUND OF THE INVENTION

The peripheral component interconnect (PCI) bus is a high performance 32 or 64 bit bus with multiplexed address and data lines. Revision 2.2 of the PCI Local Bus Specification, which is incorporated herein by reference, defines the PCI interface protocol, electrical, mechanical, and configuration specifications for PCI bus components. The PCI bus is processor independent, which allows for an efficient transition to future processor generations, and may be used with multiple processor architectures. This processor independence allows the PCI bus to be optimized for input/output (I/O) functions, enabling concurrent operations of the PCI bus with the processor and memory devices, and accommodates multiple high speed peripheral device cards. These high speed peripheral device cards may also include a processor. The term peripheral device card used hereafter thus refers to device cards and processor device cards.

An electronic system, such as a computer device, typically includes several device cards which communicate with one or more processors. As shown in FIGS. 1 and 2, a plurality of device card connectors 14a–14h are on the printed circuit board or printed circuit motherboard 12 for receiving device cards or processor device cards, such as device card 16. Alternatively, a backpanel or interface board of the computer device may carry the plurality of device card connectors 14a–14h.

Two PCI busses 18a, 18b are arranged in parallel across the motherboard 12, i.e., each device card connector 14a–14h is connected to two separate PCI busses. Dual busses provide increased performance and increased fault tolerance. Device card 16, for example, is connected to device card connector 14a and communicates with a processor or other devices via one of two PCI busses 18a or 18b through respective bus connections 19a or 19b. Based upon the capacitive loading, connector physics, allowed timing budget, and bus timing definitions, there are a limited number of available device card connectors 14a–14h. Conformance to the maximum loading requirements typically results in a maximum number of eight device card connectors 14a–14h per PCI bus 18a or 18b, as illustrated.

Increased processor performance, increased I/O functions and higher I/O bandwidths are required to increase high performance for a computer device. This translates into a requirement for a large number of device card connectors 14a–14h for connecting to the PCI busses 18a, 18b. One approach to increasing the number of available device card connectors 14a–14h is to connect two PCI buses 18a to 20a or 18b to 20b using a PCI-to-PCI bus bridge 22a or 22b, as shown in FIG. 2. A disadvantage of using PCI-to-PCI bus bridges 22a and 22b is that the connections require additional signals and involves two device card connectors 14h and 14i on the motherboard 12. That is, one device card connector 14(h) is required from the parallel PCI busses 18a and 18b, and one device card connector 14(i) is required from the PCI busses 20a and 20b. Consequently, dual busses are less efficient and may utilize a different interface with crossovers between adjacent device card connectors or with large double slot device card assemblies.

Another approach to increase the load and expansion capabilities of the PCI bus is disclosed in the U.S. Pat. No. 5,887,144 to Guthrie et al. Guthrie et al. discloses a primary PCI bus, a plurality of secondary PCI busses for connecting a plurality of additional device cards, and a plurality of switches for connecting the primary PCI bus to a corresponding one of the secondary PCI busses. The device card connectors, i.e., load capabilities of the primary PCI bus, are expanded via the use of the switches connecting a secondary PCI bus to the primary PCI bus.

PCI device card connector expansion is also disclosed in U.S. Pat. No. 5,696,949 to Young. An asynchronous PCI-to-PCI bridge for insertion into a host PCI device card connector is coupled via a cabled PCI bus to an expansion module. An expanded number of device card connectors are thereby available to the host system via the expansion module. Yet another approach to increase PCI device card connectors is disclosed in U.S. Pat. No. 5,764,924 to Hong. Hong discloses an apparatus for extending a PCI bus interface to a remote I/O backplane through a high speed serial link providing a larger number of I/O device card connectors.

While the above described approaches increase the number of device card connectors on a PCI bus, there is still a continuing need to increase the load and expansion capabilities of the PCI bus, particularly without requiring external connections or non-standard sized device cards.

SUMMARY OF THE INVENTION

In view of the foregoing background, it is therefore an object of the present invention to increase the load and expansion capabilities of the PCI bus without requiring external connections.

This and other objects, advantages and features in accordance with the present invention are provided by a computer device comprising an interface board, a plurality of busses on the interface board, and a plurality of device card connectors carried by the interface board. The plurality of device card connectors preferably comprises at least one first device card connector coupled to first and second busses synchronous with one another, and at least one second device card connector coupled to the second bus and to a third bus asynchronous with the second bus.

The busses are connected so that the busses may preferably be added in groups according to the number of connectors supported by the interface board, and not by the loading limitations of the PCI busses. Moreover, external connections are not required for connecting the busses together. By defining both synchronous and asynchronous device card connectors, device cards requiring either synchronous or asynchronous communications may be utilized by the computer device. A first bus clock is preferably connected to the first and second busses, and a second bus clock is connected to the third bus.

Each device card may include an interface bridge for connecting to a respective asynchronous or synchronous device card connector. Each device card may also preferably include a processor. The computer device preferably further comprises at least one third device card connector coupled to the third bus and to a fourth bus synchronous with the third bus, and at least one fourth device card connector coupled to the fourth bus and to a fifth bus asynchronous with the fourth bus.

Additional busses are thus added based upon the available number of device card connectors on the interface board.

The busses that are synchronous with one another preferably share the same bus clock. Each bus is preferably a peripheral component interface (PCI) bus. The computing device may also be included within a satellite system, where space and weight limitations are critical. The satellite system preferably includes an embedded computer system interfacing with the plurality of busses linked together.

Another aspect of the invention is a method for configuring a plurality of device card connectors on an interface board in a computer device comprising a plurality of busses on the interface board. The method preferably comprises connecting at least one first device card connector to first and second busses synchronous with one another, and connecting at least one second device card connector to the second bus and to a third bus asynchronous with the second bus. The method preferably further comprises connecting at least one third device card connector to the third bus and to a fourth bus synchronous with the third bus, and connecting at least one fourth device card connector to the fourth bus and to a fifth bus asynchronous with the fourth bus.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 3:
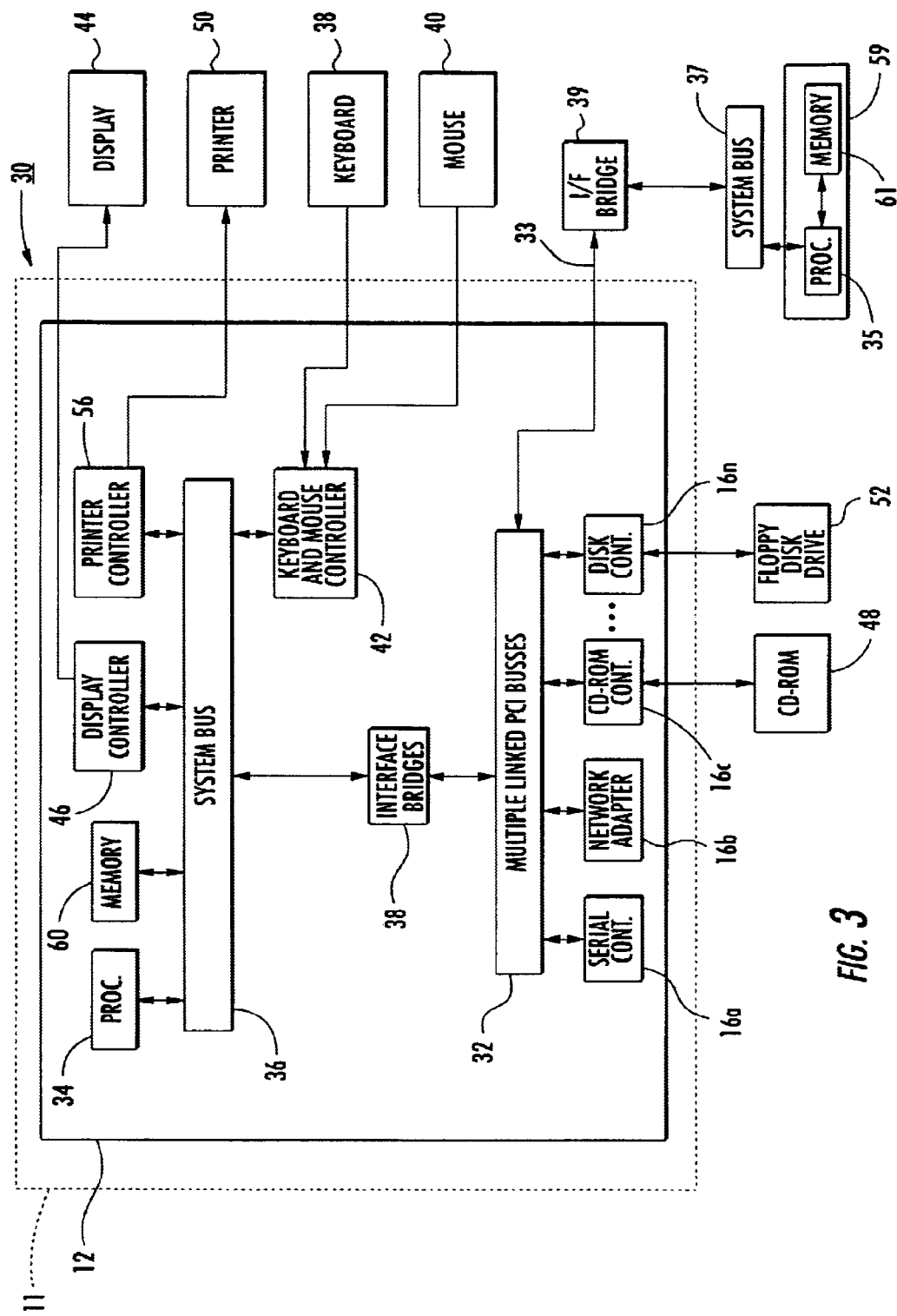
FIG. 3 is a block diagram of a computer device including the multiple linked PCI busses in accordance with the present invention.

A computer device 30 implementing multiple linked PCI busses 32 in accordance with the present invention is initially described with reference to FIG. 3. Device cards 16a–16n are connected to the multiple linked PCI busses 32. The computer device 30 includes a housing 11, a printed circuit motherboard 12 carried by the housing 11, and a processor 34 connected to a system bus 36 on the motherboard. The multiple linked PCI busses 32 are connected to the system bus 36 through one or more bus or interface bridges 38 on the printed circuit motherboard 12. The interface bridge 38 facilitates communications between the multiple linked PCI busses 32 and the system bus 36.

The multiple linked PCI busses 32 provide improved performance for high speed device cards 16a–16n, such as serial controller 16a, network adapter 16b, CD-ROM controller 16c, and disk controller 16n. A CD-ROM 48 and a floppy disk drive 52 are thus connected to the multiple linked PCI busses 36 through respective controllers 16c and 16d. Communication between the illustrated computer device 30 and other computer systems may be facilitated by the serial controller 16a and the network adapter 16b. The network adapter 62 connects the computer device 30 to a local area network (LAN), for example.

The device cards 16a–16n may also include its own processor and memory. The multiple linked PCI busses 32 may also be connected to a second system bus 37 through another interface bridge 39. The second system bus 37 may be connected to an embedded computer system 59 that includes a processor 35 and a memory 61 connected thereto. PCI bus 31 may also include multiple linked PCI busses interfacing with additional device cards or processor device cards, as will be readily appreciated by one skilled in the art.

Figure 5:
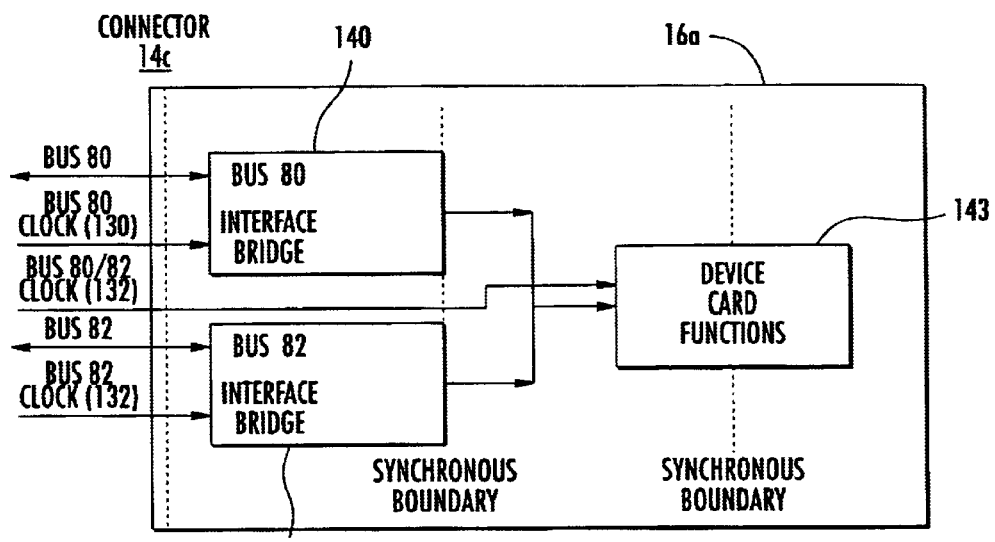
FIG. 5 is a block diagram of a synchronous device card connector and a device card in accordance with the present invention.

The PCI busses that are synchronous with one another may share the same bus clock. For example, the first and second busses 80, 82 are synchronous with one another, and, may therefore, share a distributed bus clock 130 (FIG. 5). Likewise, the third and fourth busses 84, 86 are synchronous with one another, and, may therefore, share a distributed bus clock 132. Bus clock 132 is at a different phase or speed than bus clock 130.

An asynchronous transmission sends small blocks of bits, wherein resynchronization is performed at the beginning of each block. In a synchronous transmission, blocks of bits are transmitted without start and stop codes and the exact departure or arrival time of each bit is predictable;

Bus clock 134 is connected to the fifth and sixth busses 88, 90 and operates at a phase or speed different than bus clock 132. Bus clock 134 may, however, be the same phase or speed as bus clock 130. Consequently, bus clock 130 and 134 may be the same bus clock distributed to the applicable busses. Bus clock 136 is connected to the seventh and eighth busses 92, 94 and operates at a phase or speed different than bus clock 134. Bus clock 136 may, however, be the same phase or speed as bus clock 132. Consequently, bus clock 132 and 136 may be the same bus clock distributed to the applicable busses. Implementation of the present invention is also applicable to other types of busses that operate independent of the processor speed, as readily appreciated by one skilled in the art.

Figures 1, 2:
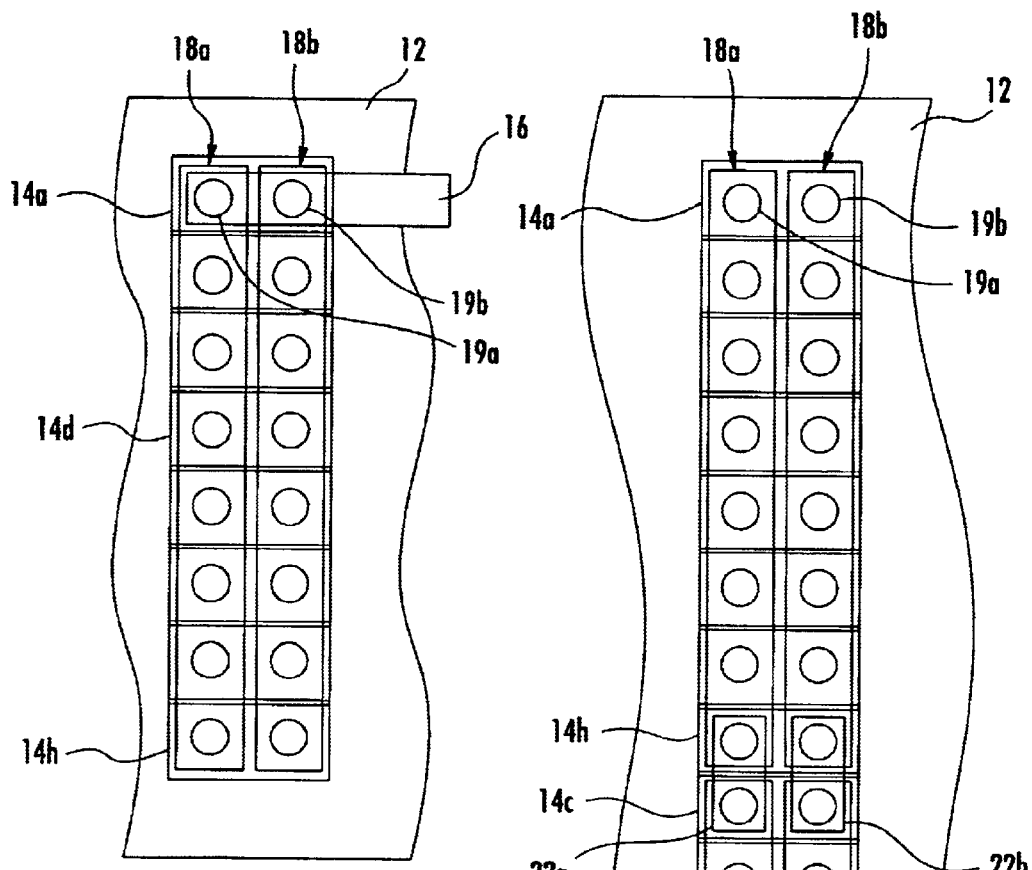
FIG. 1 is a diagram of a motherboard with PCI busses connected in parallel in accordance with the prior art.
FIG. 2 is a diagram of an expanded motherboard connecting PCI busses to the parallel PCI busses illustrated in FIG. 1.

As will be explained in greater detail below, connecting the PCI busses to offset groups of device card connectors on the motherboard 12 permits the addition of one or more PCI busses based upon the actual number of device card connectors carried by the motherboard 12, and not on PCI bus loading constraints. The multiple linked PCI busses 32 remove the need for different types of external connections between busses, such as the PCI-to-PCI bus bridge 22 illustrated in FIG. 2. The multiple linked PCI busses 32 also permit single bus increments to be added as needed to support the load and expansion needs of the computer device 30, instead of having to add busses in groups of two, as also shown in FIG. 2.

A variety of devices are connected to the system bus 36 in the illustrated computer device 30, such as a keyboard 38 and a pointing device 40, wherein the pointing device may be a mouse. The keyboard 38 and the mouse 40 are connected to the system bus 36 through a controller 42. A display 44 is also connected to the system bus 36 via a display controller 46. In addition, a printer 50 may also be connected to the system bus 36 through a controller 56.

The computer device 30 is controlled by instructions executed within the processor 34. A memory device 60 is connected to the system bus 36. The illustrated memory device 60 may be a random access memory (RAM), a read only memory (ROM) and/or non-volatile memory. Any of the above described devices connected to the system bus 36 could also be connected to the multiple linked PCI busses 32, as readily appreciated by one skilled in the art.

Figure 4:
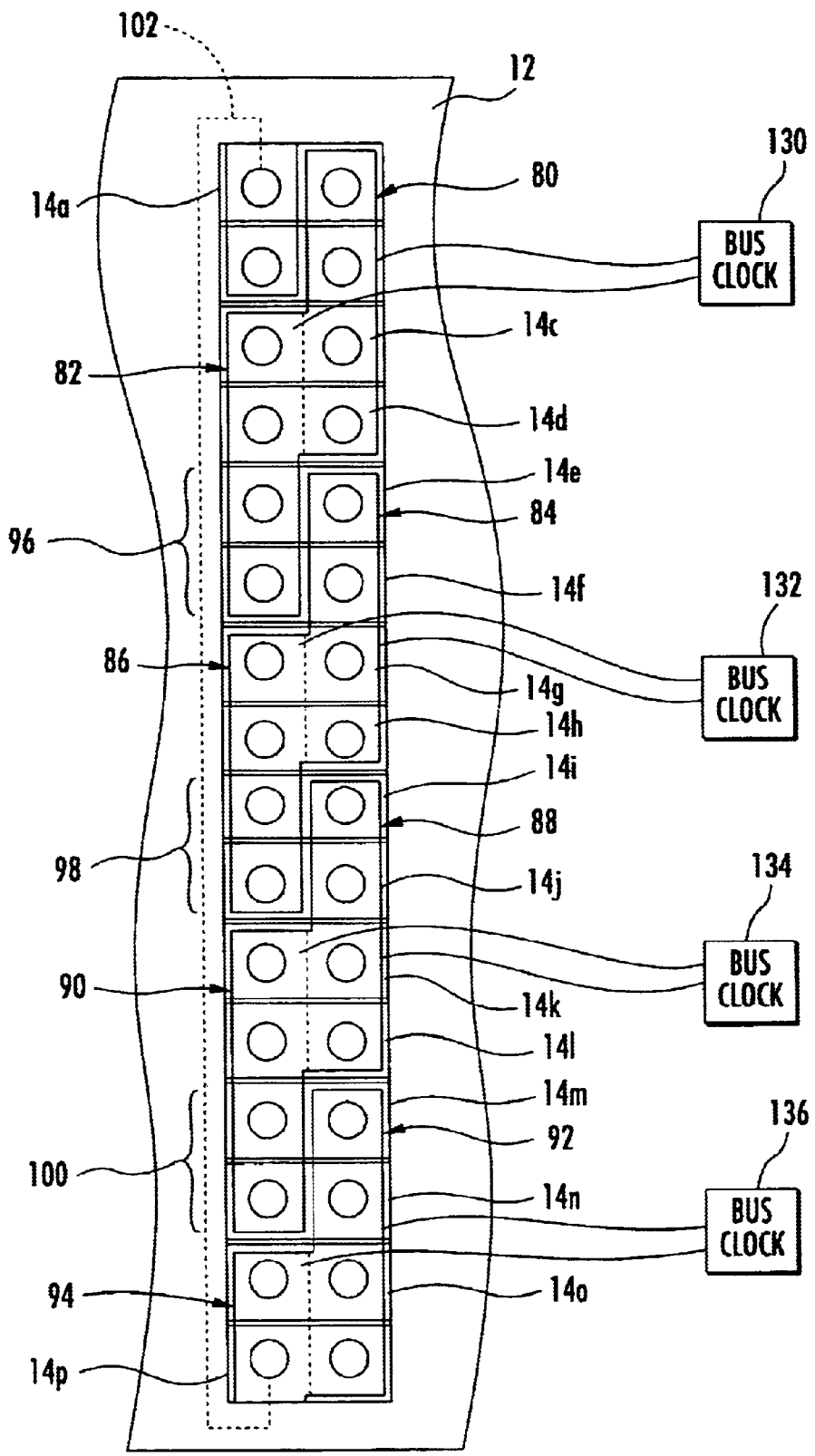
FIG. 4 is a schematic plan view of a portion of the motherboard of the computer device shown in FIG. 3.
Figure 6:
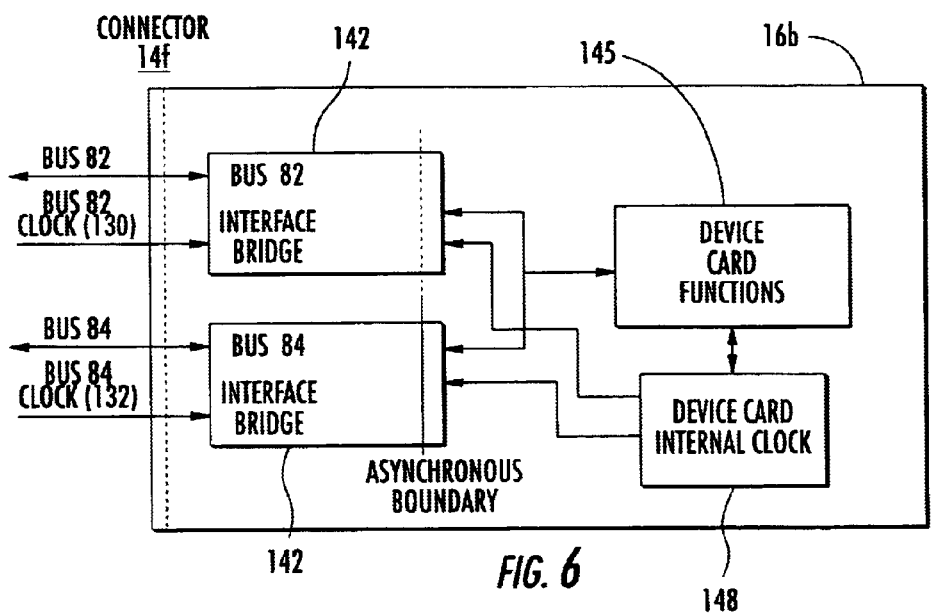
FIG. 6 is a block diagram of an asynchronous device card connector and a device card in accordance with the present invention.

Referring now to FIGS. 4–6, a printed circuit motherboard or interface board 12 comprises a plurality of busses 80–94, and a plurality of device card connectors 14a–14p carried by the motherboard. The motherboard 12 comprises at least one first connector 14d coupled to first and second busses 80, 82 synchronous with one another, and at least one second connector 14f coupled to the second bus 82 and to a third bus 84 asynchronous with the second bus. The plurality of busses 80–94 correspond to the multiple linked PCI busses 32 illustrated in FIG. 3.

In the illustrated embodiment, each bus 80–94 supports four device card connectors instead of eight, as shown in FIGS. 1 and 2. For example, bus 80 is connected to device card connectors 14a–14d, as shown in FIG. 4. As previously discussed, there are a limited number of device card connectors supported by a PCI bus. This is due to the capacitive loading of the device cards 16a–16n connected to the motherboard 12, allowed timing budget, and required timing definitions for the computer device 30. Consequently, the actual number of device card connectors 14a–14d supported by a PCI bus 80 may be less than four.

As previously discussed, dual parallel busses are less efficient and utilize a different interface for crossover with adjacent connector busses as they require two device card connectors for a PCI-to-PCI bus bridge 22, as illustrated in FIG. 2. In the present invention, however, the first and second busses 80, 82 are offset from each other, i.e., these parallel offset busses are not connected to all of the same connectors. More particularly, PCI bus 80 is connected to device card connectors 14a–14d, whereas PCI bus 82 is connected to device card connectors 14c–14f. Busses 80 and 82 thus overlap at common device card connectors 14c and 14d, which defines a synchronous region. Since the two PCI busses 80, 82 run off the same bus clock phase or speed, these connectors 14c and 14d define 110 synchronous connectors.

A device card 16a connected at a common node between two PCI busses can utilize this single clock and be synchronous with both the bus clocks. Bus interface 80 or bus interface 82 can pass its clock to a card device 16a connected to a synchronous connector 14c, as shown in FIG. 5. Each bus interface includes an interface bridge 140, and circuit 143 performs functions applicable to device card 16a.

Similarly, a third and fourth bus 84, 86 are offset from each other, i.e., they are parallel and offset and are not connected to all of the same connectors. These two busses 84, 86 also run off the same bus clock to define synchronous device card connectors 14g, 14h where they are connected in common together. However, the clock phase or speed is different from the clock phase or speed of the first and second busses 80, 82. The offset portion 96 of the third bus 84 is paired with the corresponding offset portion of the second bus 82 to define asynchronous device connectors 14e, 14f. The offset portion 96 thus represents where asynchronous device connectors are defined by two adjacent busses that are asynchronous with each other.

Each bus 82, 84 runs at a different clock phase or speed so that an asynchronous boundary is required between at least one of the bus 82 and 84 interfaces, as shown in FIG. 6. The device card side of the asynchronous boundary of device card 16b connected to an asynchronous connector 14f can use bus clock 82, bus clock 84 or the device card may be hardwired to use its own internal clock 148. Each bus interface includes an interface bridge 142, and circuit 145 performs functions applicable to device card 16b. The interface bridge 142 for an asynchronous boundary includes additional boundary and speed matching registers as compared to interface bridge 140 for a synchronous boundary.

Still referring to FIG. 4, a fifth and sixth bus 88, 90 are offset from each other, i.e., they are not connected to all of the same connectors. These two busses 88, 90 also run at the same clock phase or speed to define synchronous connectors 14k, 14l where they are connected in common together. The clock phase or speed of these busses 88, 90 are different from the clock phase or speed of the third and fourth busses 84, 86. The offset portion 98 of the fifth bus 88 is paired with the offset portion of the fourth bus 86 to define asynchronous device connectors 14i, 14j.

Likewise, a seventh and eighth bus 92, 94 are offset from each other. These two busses 92, 94 also run at the same clock phase or speed to define synchronous connectors 14o, 14p where they are connected in common together. The clock phase or speed of these busses 92, 94 are different from the clock phase or speed of the fifth and sixth busses 88, 90. The offset portion 100 of the sixth bus 90 is paired with the offset portion of the seventh bus 92 to define asynchronous device connectors 14m, 14n. Depending on the size of the motherboard 12, wiring channels and the number of device connectors 14a–14p, the orphan bus 94 connections at the ends may either be connected together, as indicated by the dashed line 102, or left as two small independent PCI busses, or even wired for some other purpose.

The number of synchronous or asynchronous connectors may be expanded until the number of bus connections per bus reaches the bus performance limits, e.g., eight, or hardware implementation limitations. If a less number of asynchronous device card connectors are needed, then the added busses can have the same clock phase or speed so that the offset portions of adjacent busses define synchronous device connectors instead. By connecting the plurality of device card connectors 14a–14p as described above, the PCI busses 80–94 may be added based upon the available number of connectors on the motherboard 12, and not by the loading constraints of the PCI busses themselves.

By allowing both synchronous and asynchronous connectors, device cards requiring synchronous or asynchronous communications may be utilized. Each device card includes an interface bridge to interface between the different phases of the parallel offset busses, as best shown in FIGS. 5 and 6. This overlap removes the need for external types of connections between busses, such as the PCI-to-PCI interface bus bridge 22 illustrated in FIG. 2.

Moreover, the multiple linked PCI busses 80–94 overcome distance, interconnection and fault tolerances issues. The multiple linked PCI busses 80–94 are scalable to the number of available device card connectors on the motherboard 12, the types of device card connectors 14a–14p needed, and may be done in single bus increments.

Figure 7:
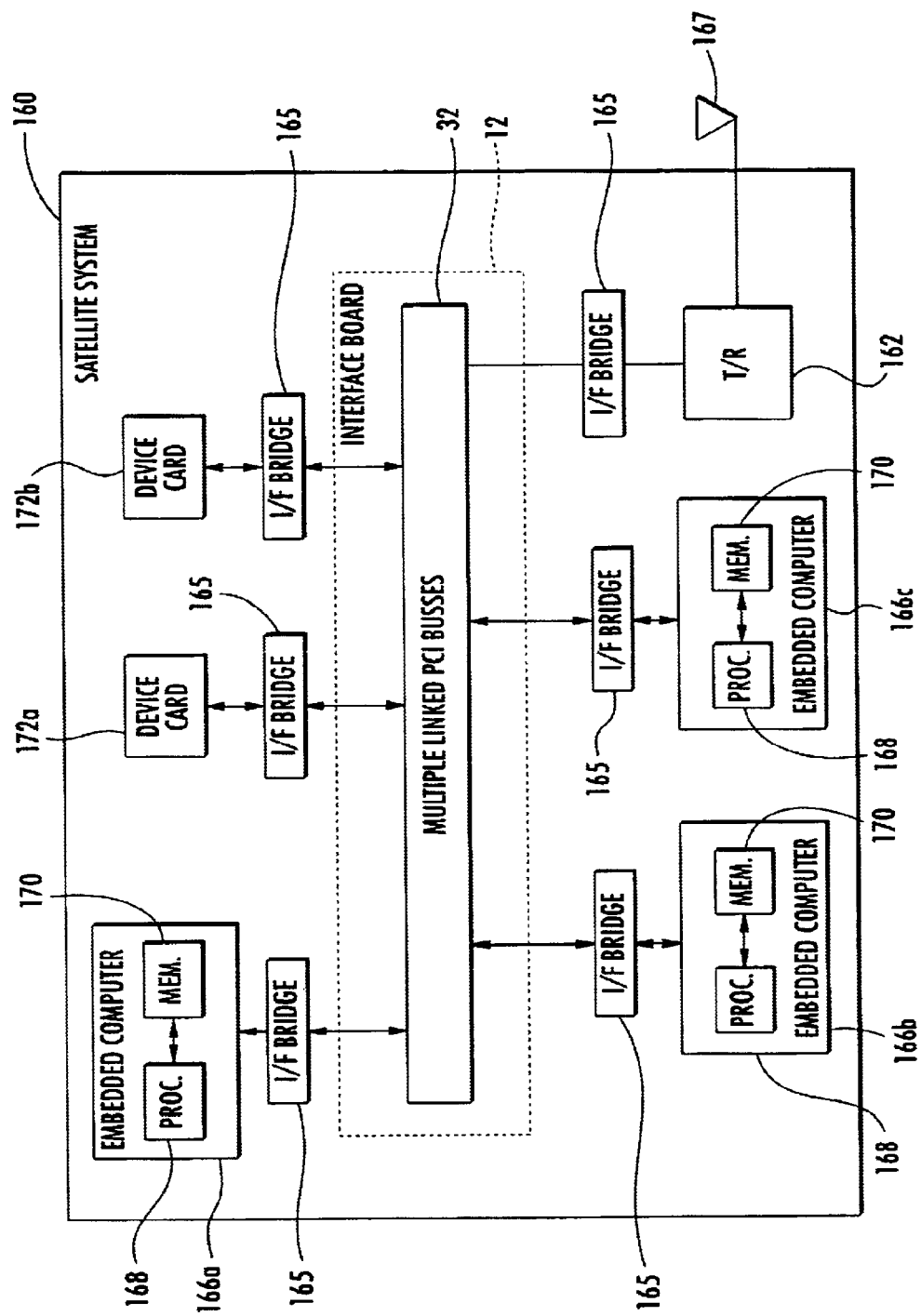
FIG. 7 is a block diagram of a satellite system including the multiple linked PCI busses in accordance with the present invention.

Another aspect of the invention is a satellite system 160 including the multiple linked PCI busses 32, as best shown in FIG. 7. The satellite system 160 comprises a transceiver 162, an interface board 12, and a plurality of busses 32 on the interface board. A plurality of device card connectors 14a–14p (FIG. 4) are carried by the interface board 12. The device card connectors 14a–14p comprises at least one first device card connector 14d coupled to first and second busses 80, 82 synchronous with one another, and at least one second device card connector 14f coupled to the second bus and to a third bus 84 asynchronous with the second bus 82, as best shown in FIG. 4.

The transceiver 162 is connected to one of the at least first and second device card connectors 14d, 14f through an interface bridge 165. The interface bridge 165 may be separate from the transceiver 162, as shown in FIG. 7, or may be included in the transceiver. An antenna 167 is connected to the transceiver 162. In addition, other device cards 172a–172b may be connected to the multiple linked PCI busses 32 through a respective interface bridge 165.

The satellite system 160 may be a multiple processor architecture wherein the device cards connected to the multiple linked PCI busses 32 include It a processor 168 therein to define an embedded computer 166a–166c. Each embedded computer 166a–166c further includes a memory 170 connected to the processor 168. Each of the embedded computers 166a–166c also interface the multiple linked PCI busses 32 via a respective interface bridge 165.

Yet another aspect of the invention is a method for configuring a plurality of device card connectors 14a–14p on a printed circuit motherboard 12 in a computer device 30 comprising a plurality of busses 80–94 on the motherboard. The method comprises connecting at least one first connector 14d to first and second busses 80, 82 synchronous with one another, and connecting at least one second connector 14f to the second bus and to a third bus 84 asynchronous with the second bus.

The method further comprises connecting at least one third connector 14h to the third bus 84 and to a fourth bus 86 synchronous with one another, and connecting at least one fourth connector 14j coupled to the fourth bus and to a fifth bus 88 asynchronous with the fourth bus. The method further includes connecting a bus bridge 38 to the plurality of busses 80–94, and connecting the bus bridge to a system bus 36 on the printed circuit motherboard 12.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A computer device comprising:
   an interface board;
   a plurality of busses on said interface board; and
   a plurality of device card connectors carried by said interface board and comprising
      at least one first device card connector coupled to first and second busses synchronous with one another, and
      at least one second device card connector coupled to said second bus and to a third bus asynchronous with said second bus.

2. A computer device according to claim 1, further comprising at least one third device card connector coupled to said third bus and to a fourth bus synchronous with said third bus.

3. A computer device according to claim 2, further comprising at least one fourth device card connector coupled to said fourth bus and to a fifth bus asynchronous with said fourth bus.

4. A computer device according to claim 1, wherein a device card comprises an interface bridge for interfacing the synchronous connector of said at least one first device card connector.

5. A computer device according to claim 1, wherein a device card comprises an interface bridge for interfacing the asynchronous connector of said at least one second device card connector.

6. A computer device according to claim 1, wherein said first, second and third busses each comprises a peripheral component interface (PCI) bus.

7. A computer device according to claim 1, further comprising:
   a first bus clock connected to said first and second busses; and
   a second bus clock connected to said third bus.

8. A computer device according to claim 1, further comprising at least one device card connected into a respective device card connector.

9. A computer device according to claim 8, wherein said at least one device card comprises a processor.

10. A computer device according to claim 8, wherein said at least one device card comprises a processor and a memory connected to said processor.

11. A computer device according to claim 1, further comprising:
    a system bus on said interface board; and
    an interface bridge coupling said system bus and at least one of said plurality of busses.

12. A computer device according to claim 1, wherein said at least one first and second device card connectors each comprises a pair of side-by-side connectors.

13. A computer device comprising:
    a housing;
    a printed circuit motherboard carried by said housing;
    a processor on said printed circuit motherboard;
    a system bus coupled to said processor;
    a plurality of busses on said printed circuit motherboard;
    an interface bridge coupling said system bus and said plurality of busses; and
    a plurality of device card connectors carried by said printed circuit motherboard and comprising
       at least one first device card connector coupled to first and second busses synchronous with one another, and
       at least one second device card connector coupled to said second bus and to a third bus asynchronous with said second bus.

14. A computer device according to claim 13, further comprising at least one third device card connector coupled to said third bus and to a fourth bus synchronous with said third bus.

15. A computer device according to claim 14, further comprising at least one fourth device card connector coupled to said fourth bus and to a fifth bus asynchronous with said fourth bus.

16. A computer device according to claim 13, wherein a device card comprises an interface bridge for connection to the synchronous connector of said at least one first device card connector.

17. A computer device according to claim 13, wherein a device card comprises an interface bridge for connection to the asynchronous connector of said at least one second device card connector.

18. A computer device according to claim 13, wherein said first, second and third busses each comprises a peripheral component interface (PCI) bus.

19. A computer device according to claim 13, further comprising:
a first bus clock connected to said first and second busses; and
a second bus clock connected to said third bus.

20. A computer device according to claim 13, further comprising at least one device card connected into a respective device card connector.

21. A computer device according to claim 20, wherein said at least one device card comprises a processor.

22. A computer device according to claim 20, wherein said at least one device card comprises a processor and a memory connected to said processor.

23. A computer device according to claim 13, wherein said at least one first and second device card connectors each comprises a pair of side-by-side connectors.

24. A satellite system comprising:
a transceiver;
an interface board;
a plurality of busses on said interface board; and
a plurality of device card connectors carried by said interface board and comprising
at least one first device card connector coupled to first and second busses synchronous with one another, and
at least one second device card connector coupled to said second bus and to a third bus asynchronous with said second bus;
said transceiver being connected to one of said at least first and second device card connectors.

25. A satellite system according to claim 24, further comprising at least one third device card connector coupled to said third bus and to a fourth bus synchronous with said third bus.

26. A satellite system according to claim 25 further comprising at least one fourth device card connector coupled to said fourth bus and to a fifth bus asynchronous with said fourth bus.

27. A satellite system according to claim 24, wherein a device card comprises an interface bridge for interfacing the synchronous connector of said at least one first device card connector.

28. A satellite system according to claim 24, wherein a device card comprises an interface bridge for interfacing the asynchronous connector of said at least one second device card connector.

29. A satellite system according to claim 24, wherein said first, second and third busses each comprises a peripheral component interface (PCI) bus.

30. A satellite system according to claim 24, further comprising:
a first bus clock connected to said first and second busses; and
a second bus clock connected to said third bus.

31. A satellite system according to claim 24, further comprising at least one device card connected into a respective device card connector.

32. A satellite system according to claim 31, wherein said at least one device card comprises a processor.

33. A satellite system according to claim 31, wherein said at least one device card comprises a processor and a memory connected to said processor.

34. A satellite system according to claim 24, further comprising:
a system bus on said interface board; and
an interface bridge coupling said system bus and at least one of said plurality of busses.

35. A satellite system according to claim 24, wherein said at least one first and second connectors each comprises a pair of side-by-side connectors.

36. A computer device comprising:
a backpanel;
a plurality of parallel, offset data busses; and
a plurality of device card connectors carried by said backpanel and comprising
at least one first device card connector coupled to first and second parallel, offset data busses synchronous with one another, and
at least one second device card connector coupled to said second data bus and to a third data bus asynchronous with said second data bus, said third data bus parallel, and offset with said second data bus.

37. A computer device according to claim 36, further comprising at least one third device card connector coupled to said third data bus and to a fourth data bus synchronous with said third data bus, said fourth data bus parallel and offset with said third data bus.

38. A computer device according to claim 37, further comprising at least one fourth device card connector coupled to said fourth data bus and to a fifth data bus asynchronous with said fourth data bus, said fifth data bus parallel and offset with said fourth data bus.

39. A computer device according to claim 36, wherein a device card comprises an interface bridge for connection to the synchronous connector of said at least one first device card connector.

40. A computer device according to claim 36, wherein a device card comprises an interface bridge for connection to the asynchronous connector of said at least one second device card connector.

41. A computer device according to claim 36, wherein said first, second and third data busses each comprises a peripheral component interface (PCI) bus.

42. A computer device according to claim 36, further comprising:
a first data bus clock connected to said first and second data busses; and
a second data bus clock connected to said third data bus.

43. A computer device according to claim 36, further comprising at least one device card connected into a respective device card connector.

44. A computer device according to claim 43, wherein said at least one peripheral device card comprises a processor.

45. A computer device according to claim 36, wherein said at least one first and second device card connectors each comprises a pair of side-by-side connectors.

46. A method for configuring a plurality of device card connectors on an interface board carried by a computer device comprising a plurality of busses, the method comprising:
connecting at least one first device card connector to first and second busses synchronous with one another; and
connecting at least one second device card connector to the second bus and to a third bus asynchronous with the second bus.

47. A method according to claim 46, further comprising connecting at least one third device card connector to the third bus and to a fourth bus synchronous with the third bus.

48. A method according to claim 47, further comprising connecting at least one fourth device card connector to the fourth bus and to a fifth bus asynchronous with the fourth bus.

49. A method according to claim 46, wherein each device card comprises an interface bridge; the method further comprising connecting the device card to the synchronous connector of the at least one first device card connector via the interface bridge.

50. A method according to claim 49, wherein at least one device card comprises a processor.

51. A method according to claim 47, wherein each device card comprises an interface bridge; the method further comprising connecting the device card to the asynchronous connector of the at least one second device card connector via the interface bridge.

52. A method according to claim 46, wherein the first, second and third busses each comprises a peripheral component interface (PCI) bus.

53. A method according to claim 46, further comprising:

connecting a first bus clock to the first and second busses; and connecting a second bus clock to the third bus.

* * * * *